(No Model.)

J. HEITNER.
Razor.

No. 229,127.  Patented June 22, 1880.

Witnesses
Otto Hufeland
William Miller

Inventor
John Heitner
by
Van Santvoord & Hauff
his attorneys

UNITED STATES PATENT OFFICE.

JOHN HEITNER, OF NEW YORK, N. Y.

RAZOR.

SPECIFICATION forming part of Letters Patent No. 229,127, dated June 229, 1880.

Application filed May 18, 1880. (No model.)

*To all whom it may concern:*

Be it known that I, JOHN HEITNER, a citizen of the United States, residing at New York, in the county and State of New York, have invented new and useful Improvements in Shaving Implements, of which the following is a specification.

This invention relates to that class of devices embodying a cutting-blade and a guard-plate, a portion of which forms a handle for manipulating the implement.

Figure 1:
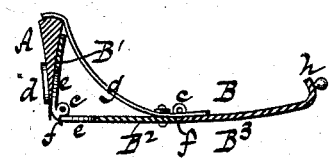
Figure 2:
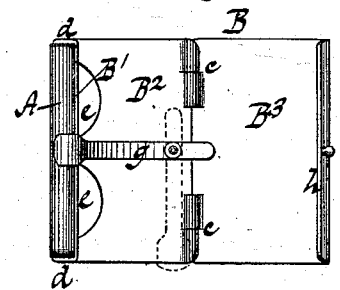
Figure 3:
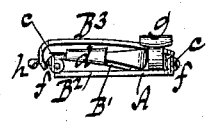

This invention is illustrated in the accompanying drawings, in which Figure 1 is a longitudinal section, showing the positions of the parts when the implement is to be put to use. Fig. 2 is a plan or top view. Fig. 3 is a side view when the parts are folded together.

Similar letters indicate corresponding parts.

The letter A designates the cutting-blade, and B the guard-plate. The character of the cutting-blade A is substantially similar to that of a razor-blade, and the guard-plate B is constructed in sections $B'$ $B^2$ $B^3$, one adapted to support the cutting-blade and the remainder forming a handle.

The sections $B'$ $B^2$ $B^3$ are hinged together, as at $c$ $c$, in a suitable manner to fold on each other, and the blade-section $B'$ is provided with grooves $d$ $d$, one at each end, into which the ends of the cutting-blade A are fitted.

At the junction of the blade-section $B'$ with the handle-section $B^2$ each of such sections is provided with interstices $e$.

When the sections $B'$ $B^2$ $B^3$ are spread or unfolded the blade-section $B'$ is substantially at a right angle to the remainder or handle-sections $B^2$ $B^3$, while the latter are substantially flush with each other, as indicated in Fig. 1, and for the purpose of regulating the positions of the sections, I employ stops $f$, which are formed by or on the edges of the sections, so as to check the same as they are unfolded, and a spring, $g$, which is pivoted to the handle-section $B^2$, and extends across the joint between the handle-sections $B^2$ $B^3$ at one end, while it bears against the blade-section $B'$, namely, by impinging upon the cutting-blade A, and by this arrangement the spring is made to hold also the blade in its position.

When the implement is applied to use, the handle-sections $B^2$ $B^3$ are taken hold of, and the edge of the cutting-blade A is drawn across the face in the manner of a razor, when the lather thus scraped off escapes by the interstices $e$.

When the implement has been used and is to be stowed away, the spring $g$ is swung around to the position shown in dotted outline in Fig. 2, the blade-section $B'$ is folded down on the handle-section $B^2$, and the handle-section $B^3$ is folded down upon the whole, as shown in Fig. 3; and it will be seen that the implement is thus brought into a very small compass.

One edge of the handle-section $B^3$ is bent to form a catch, $h$, and when the parts are folded together this catch engages the stop $f$ at the junction of the blade-section $B'$ with the handle-section $B^2$, so as to lock the parts; and to facilitate the separation of the parts, I attach to the handle-section $B^3$ a suitable knob or finger-piece.

What I claim as new, and desire to secure by Letters Patent, is—

1. The combination, with the cutting-blade, of a guard-plate constructed in sections which are hinged to fold on each other, one adapted to support the cutting-blade and the remainder forming a handle, interstices at the junction of the blade-section with the handle-sections, and means for holding the blade-section substantially at a right angle to the handle-sections, and holding the latter substantially flush with each other, the whole constructed and adapted for use, substantially as described.

2. The combination, with the cutting-blade, of a guard-plate constructed in sections which are hinged together and constructed with the stops $f$ for regulating the positions of the sections, one section adapted to support the cutting-blade and the remainder forming a handle, interstices at the junction of the blade-section with the handle-sections, and the spring $g$, for clamping the cutting-blade and holding the sections in a spread or unfolded condition, the whole constructed and adapted for use, substantially as described.

In testimony whereof I have hereunto set my hand in the presence of two subscribing witnesses.

JOHN HEITNER.

Witnesses:
J. HERMANN WAHLERS,
E. F. KASTENHUBER.